Patented Apr. 16, 1946

2,398,703

UNITED STATES PATENT OFFICE 2,398,703

POROUS COMPOSITIONS

Henry A. Gardner, Chevy Chase, Md.

No Drawing. Application March 10, 1943,
Serial No. 478,719

2 Claims. (Cl. 106—122)

This invention relates to a new composition of matter and a method of making the same and to articles made from the new composition of matter.

It has been found that light-weight substances having valuable new properties and a wide variety of useful applications may be obtained by reacting a finely divided metal in substantial proportions with a binder composition capable of reacting with the metal with evolution of a gas. The finely divided metal forms a substantial proportion of the resulting substance, preferably not substantially less than ten per cent but not substantially more than 50 per cent by weight thereof. Any metal or metal alloy capable of reacting in comminuted form with a suitable binder substance, such as an acidic or acid-containing composition with evolution of a gas, may be used, such as, for example, aluminum, magnesium, zinc, and iron. In general, however, metals of low specific gravity such as aluminum and magnesium result in compositions having particularly desirable properties.

The reactive binder substance is preferably a material consisting of or containing organic acids, such as shellac, Xanthorrhoea resins (e. g., "red gum," "black boy gum" and "gum accroides"), rosin and other acidic or acid-containing natural resins, or synthetic plastic or resinous substances containing, for example, phthalic, malic, maleic and other acids, or their acid reaction products, that is to say, a natural or synthetic resin which is heat-convertible at a temperature of about 150° C., or somewhat higher, in the presence of a suitable metallic powder such as aluminum powder. The acidic binder substance may be utilized in solution or in liquid or semi-solid or solid condition.

The new compositions of the invention are porous, coherent substances comprising a substantial portion of finely divided metal particles bonded together by a binder substance reactive with the metal to produce a gas and the reaction product of the metal and the binder substance. In general, it is believed that the reaction of the binder substance with the metal particles not only produces a gaseous reaction product which serves to form a multitude of pores in the final product, but also produces a reaction product with a portion of the metal which substantially increases the binding effect and contributes to the physical characteristics of the final product.

In general, the products of the invention are light-weight, porous solid bodies having a metallic appearance and characterized by a considerable hardness and toughness. Particularly when made of metals having a low specific gravity, they have a low apparent density and readily float on water. The new products are typically non-conductors of electricity and have a high insulation power to heat flow. The heat insulating properties of the substances due to their porous structure may be very considerably enhanced when the metal particles have a high reflecting power for radiant energy in the infra-red, such as aluminum powder.

The method of producing the new products will vary with the particular metal and binder substance used, but, in general, the new materials may be produced by mixing the finely divided metal and the reactive binder substance, and, where necessary, heating or cooling the mixture to maintain a temperature at which the desired amount of gas is evolved under controllable conditions. The passing of a gas such as carbon dioxide, hydrogen or compressed air, into the reacting mixture is at times advantageous in producing a product of enhanced porosity.

The following examples are illustrative of the principles of the invention:

Example 1

20 parts by weight of dry shellac are dissolved in 80 parts by weight of alcohol. There is thoroughly mixed into the solution 20 parts by weight of finely divided aluminum powder. The mass is poured into a container, preferably filling it and not allowing any excess air space. The container is then capped. At a room temperature of 80° F., reaction takes place. Hydrogen is developed in the mass which then becomes puffed up. Solidification gradually proceeds until the mass will no longer pour.

If during the reaction the mass is placed in an oven at 140° F., the reaction takes place with greater violence, and in a few hours it may be completed.

The container is then unsealed and, if glass, it is broken to remove the solid inside.

If the above ingredients are mixed in the above proportions and vacuum is used during the process, an even more speedy reaction takes place.

If the alcohol used in the above mixture contains a small quantity, say one per cent or less, of alkali such as sodium hydroxide in solution, the reaction becomes very violent. Neither heat nor vacuum is required under these conditions.

In any event, the product of the above reaction is in a solid form and has a honeycomb structure. It appears to have most of the characteristics of metal, such as hardness, brilliancy of color, rigidity. It may be worked with tools. It floats upon water. It is insoluble in the organic solvents, such as alcohol, which might have been used in the reaction mass. It is a non-conductor of electricity. It has an extremely low bulk weight. It has unique sound absorbing and insulating characteristics.

I have found that another method of accomplishing the same purpose but in a much shorter period of time is to heat shellac, Xanthorrhoea resin, and other heat-convertible resins at a temperature of 150° to 170° C. in the presence of the desired metallic powder such as aluminum powder. When the above temperatures are reached, the heat conversion of the resins takes place. Decomposition proceeds, gases are evolved, great puffing occurs, and a porous rigid mass is ultimately produced, usually in a period of 10 to 30 minutes. These puffed solid masses have the physical characteristics of that described in the previous example. This method, moreover, has the advantage of carrying on the reaction in the absence of organic volatile matter, such as alcohol or other solvent. It has the additional advantage of making it possible to react combinations of resins, some of which might be alcohol-soluble and many of which are not, but all of which initially fuse together and then become subject to the reactions referred to above. Thus, I have found it very convenient to work with shellac or Xanthorrhoea resin or similar heat-reactive resin, in the presence of any natural or synthetic resins such as phenolic resins, alkyds, maleic resins, vinyl resins, acrylic resins, urea-formaldehyde resins, cumarone-indene resins, or such natural resins as the copals. When urea-formaldehyde resins are employed, extremely rapid reactions occur, and when maleic resins are employed numerous addition reactions of an important nature doubtless occur. Specific examples illustrative of this embodiment of the invention follow:

*Example 2*

100 grams of phthalic anhydride are reacted with 40 grams of glycerin. The temperature is raised to about 225° C. to eliminate the water of reaction and to produce a clear resinous substance. While this mass is still hot, there are stirred in 100 grams of dry shellac and 40 grams of aluminum powder. The container is placed in a sand bath and heating continued at a temperature between 150° and 170° C. for a period of 20 minutes. During this time a great mass of bubbles is formed and puffing occurs. Upon cooling, the reaction mass is a solid porous block which resembles a sponge in appearance. It floats upon water. It has all the desired physical properties of rigidity, hardness and toughness.

*Example 3*

The above experiment is repeated, but in place of the glycerin phthalate there is first produced a clear resin by partially reacting 100 grams of maleic acid with 62 grams of glycerin at 200–220° C. The dry shellac and aluminum powder are then added to the somewhat stiff reaction mixture, and the mixture is heated at slightly below 200° C. for a period of 10 minutes, during which time the mass puffs and gives off gases having the odor of acrolein. After cooling, the product is a porous solid body, which appears even harder than that produced in Example 2. It floats on water.

Examination of the products produced in accordance with Examples 2 and 3 indicates that they are throughout substantially uniform in structure, there being no segregated portions differing from the balance. In other words, they seem homogeneous.

The procedure of Example 3 has been modified by omitting the shellac and reducing the amount of aluminum powder to 20 grams. In that case, also, the mass puffed materially, and produced a porous solid body of "metallic sponge" appearance which floated on water. I have also reacted the maleic acid and glycerin and heated the reaction product, in the absence of metallic powder, at a temperature of about 220° C., whereby volatile products were driven off and there was formed a puffed, sponge-like, solid body which floated on water.

*Example 4*

100 grams of maleic acid, 62 grams of glycerin, 100 grams of phthalic anhydride, 40 grams of glycerin, 100 grams of shellac, and 40 grams of chromium hydrate dry pigment are stirred together. After stirring the mass, heating is started and finally brought up to a temperature of 220° C., when almost entire elimination of water of reaction apparently has occurred. The mass froths and foams, and gives off volatile products, some of which have an acrolein odor. After the mass has puffed up greatly, it is allowed to cool, and results in a highly porous solid body which has a beautiful green color and floats upon water.

*Example 5*

100 parts by weight of phthalic anhydride are heated with one-half its molecular weight of glycerin to a temperature of about 200° C. when reaction occurs and partial esterification takes place. This clear water white substance is then allowed to cool to just above the point of solidification, and there is then stirred in the mass about 20 parts by weight of aluminum powder. Reaction occurs. If during this reaction a jet of warm air is passed through the mass, puffing occurs, and a honeycomb structure results.

*Example 6*

In reactions similar to those given in Examples 1 and 5, magnesium powder and zinc powder have been employed. The reactions with magnesium powder are extremely energetic. Those with zinc powder are less so. Nevertheless, somewhat similar "metaloidal" substances were formed.

The reaction may be carried out in molds shaped to produce useful articles of manufacture or to produce pieces such as rods or slabs which may be readily worked up into articles of manufacture, or the reaction products may be broken up and formed into the desired articles by molding under heat and pressure, particularly when the binder composition produced in the reaction has residual thermosetting properties.

The following description will indicate the wide range of usefulness of the new materials. While the products of Examples 1 and 3 therein are referred to for purposes of illustration, it is to be understood that the products of the examples have in general the same, and, in some cases, superior, utilities.

A metal chamber, in miniature resembling the door of a refrigerator, was filled with a liquid mixture such as is described in Example 1 or 3. After proper reaction there was formed within this metal chamber a solidified, honeycomb product having all the characteristics referred to above. It formed a vermin-proof, highly insulating door or side wall which could be used on refrigerators. Its insulating value appeared to be extremely high. It could therefore be used not only in refrigerators but for the side walls and roofs of railroad cars for transportation of fruit, meats, and the like.

A miniature form was made, resembling the shape of an airplane wing. Into this form were placed a few rigid wire rods to serve as reinforcements. There was then poured into this area a mixture such as is described in Example 1 or 3. After proper reaction, the form was removed. There was produced, by this cold molding process, a solid airplane wing of excellent rigidity but of extremely light weight, with good strength and other desirable physical properties. This wing will float on water. It is believed that this process offers wide possibilities in the speedy production of airplane wings, in contrast with the slow, laborious methods now employed in the building of such wings with sheets of metal or with plywood. There could be left in such wings spaces which could be utilized for holding gas tanks.

Because of the very porous nature of the material produced in Example 3 or 1, the space between the inner and outer shells of a small model of a gas tank was filled with this material and the reaction carried out at the appropriate temperature (recited in the referred-to examples). The purpose of this was to produce a bullet-proof gasoline tank from which very little if any gasoline would leak if such tank was riddled with bullets.

When the reaction product of Example 1 or 3 was formed into a doughnut-shaped ring and covered with suitable fabric, it formed a very light, tough, waterproof product which could be used as a life preserver. It floats upon water and does not become water-logged.

At the present time huge tonnages of metallic lead are used for coating electric conduits and cables. The unique properties of metallic lead and its durability make it highly desirable for this purpose. I have found, however, that the reaction product of Example 1 or that of Example 3 may be used in place of lead for the above purpose. Either forms an extremely resistant, waterproof covering for the cable wires. Fortunately, the porous product of the invention has the unique property of being a non-conductor of electricity, whereas aluminum itself and most other metals are good conductors.

When a pipe made of very thin side walls of steel metal or cellulose base products is filled with the reaction product of Example 1 or 3, a rigid member is formed, which is extremely light in weight but which has great strength. This would adapt this material for making struts and other rigid members of aircraft.

When cardboard is formed into a cylindrical container in a double wall thickness, the space between the walls may be filled with the reaction product of Example 1 or 3, to add greatly to the strength of the container.

When the reaction products of Example 1 or 3 are cast by cold molding into the form of slabs, preferably about one inch thick and from 12 inches square up, a most unique product is produced. This product may be used for many purposes. It has very remarkable sound absorbing properties because of the unique structure of the material. It may therefore be used very widely in the production of sound absorbing ceilings for offices, factories, and other places.

The product of the present invention, of which the reaction products according to Examples 3 and 1 are illustrative, can also be used as a roofing material because of its very great resistance to the conduction of heat or cold. Dwellings roofed with this product would be warmer in winter and cooler in summer. It could also be used in the production of flooring blocks to produce floors which are sound absorbing, tough, resistant to traffic, and of a highly durable nature. It could also be pressed in the form of siding or shingles to produce extremely durable structural surfaces which would be waterproof, resistant to the transmission of heat or cold, and sound absorbing. It could also be pressed into the form of furniture to produce extremely light weight furniture of good strength.

The reaction product of Example 1 or 3 may be cold molded in the form of pipe which would be extremely light in weight and resistant to soil conditions. Through pipe lines made of this material could be pumped oil, water, or other materials.

This application contains subject-matter in common with, and is a continuation-in-part of, my application Serial No. 458,842, now Patent No. 2,394,993, filed September 18, 1942.

I claim:

1. As an article of manufacture, a unitary porous rigid dielectric metalloidal body characterized by a honeycomb structure and an apparent density less than that of water, said body substantially consisting of a minor proportion not less than about 10% by weight of finely divided particles of a metal of the group consisting of magnesium and aluminum bonded together with an acidic resinous reaction product of maleic acid said binder including the reaction product of the metal with the acidic component of said resinous binder.

2. Method of making a rigid dielectric metalloidal body having a honeycomb structure and an apparent density less than that of water, which comprises admixing with an acidic partially reacted heat-convertible maleic acid-glycerin resin binder in liquid form a minor proportion, not less than 10% by weight based on the weight of said resin, of finely divided aluminum, confining the resulting mixture within an enclosed space, heating the mixture under conditions to accommodate puffing of the latter to a temperature, of the order of 200° C., at which said acidic resin reacts with a portion of said aluminum until the mixture is materially honeycombed and increased in volume and solidified and volatile ingredients are substantially separated from the resulting solid product.

HENRY A. GARDNER.